United States Patent
Ellmer et al.

(10) Patent No.: US 6,922,996 B2
(45) Date of Patent: Aug. 2, 2005

(54) METHOD FOR CONTROLLING AN ELECTRICALLY DRIVEN COMPRESSOR

(75) Inventors: Dietmar Ellmer, Regensburg (DE); Michael Stürtz, Regensburg (DE); Markus Teiner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/895,417

(22) Filed: Jul. 21, 2004

(65) Prior Publication Data

US 2005/0022525 A1 Feb. 3, 2005

Related U.S. Application Data

(63) Continuation of application No. PCT/DE03/00018, filed on Jan. 7, 2003.

(30) Foreign Application Priority Data

Jan. 21, 2002 (DE) .......................................... 102 02 146

(51) Int. Cl.⁷ ............................ F02B 33/44; F02B 33/00
(52) U.S. Cl. .............................. 60/608; 60/612; 60/602; 123/565
(58) Field of Search ......................... 60/608, 612, 602; 123/565

(56) References Cited

U.S. PATENT DOCUMENTS

| | | | | |
|---|---|---|---|---|
| 6,141,965 A | * | 11/2000 | Woollenweber et al. | 60/612 |
| 2003/0005695 A1 | * | 1/2003 | Allen et al. | 60/608 |
| 2003/0140630 A1 | * | 7/2003 | Baeuerle et al. | 60/612 |
| 2004/0093867 A1 | * | 5/2004 | Masuda | 60/608 |
| 2004/0182371 A1 | * | 9/2004 | Igarashi et al. | 123/564 |

FOREIGN PATENT DOCUMENTS

WO      WO 47879 A1 * 8/2000 ........... F02B/37/04

* cited by examiner

*Primary Examiner*—Thai-Ba Trieu
(74) *Attorney, Agent, or Firm*—Morrison & Foerster LLP

(57) ABSTRACT

An electrical booster in an internal combustion engine with an exhaust gas turbocharger is activated so that the electrical booster is connected with the minimum possible power consumption. The connection of the electric booster depends on the power balance, the electric booster being activated when the instantaneously available compressor power of the exhaust gas turbocharger is insufficient to provide the necessary power.

14 Claims, 4 Drawing Sheets

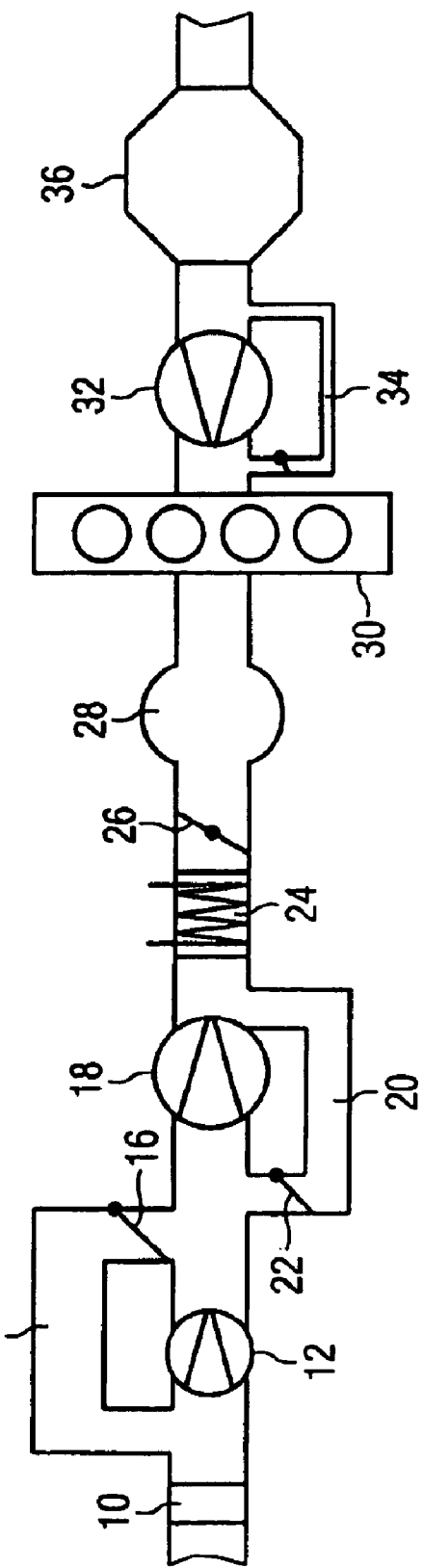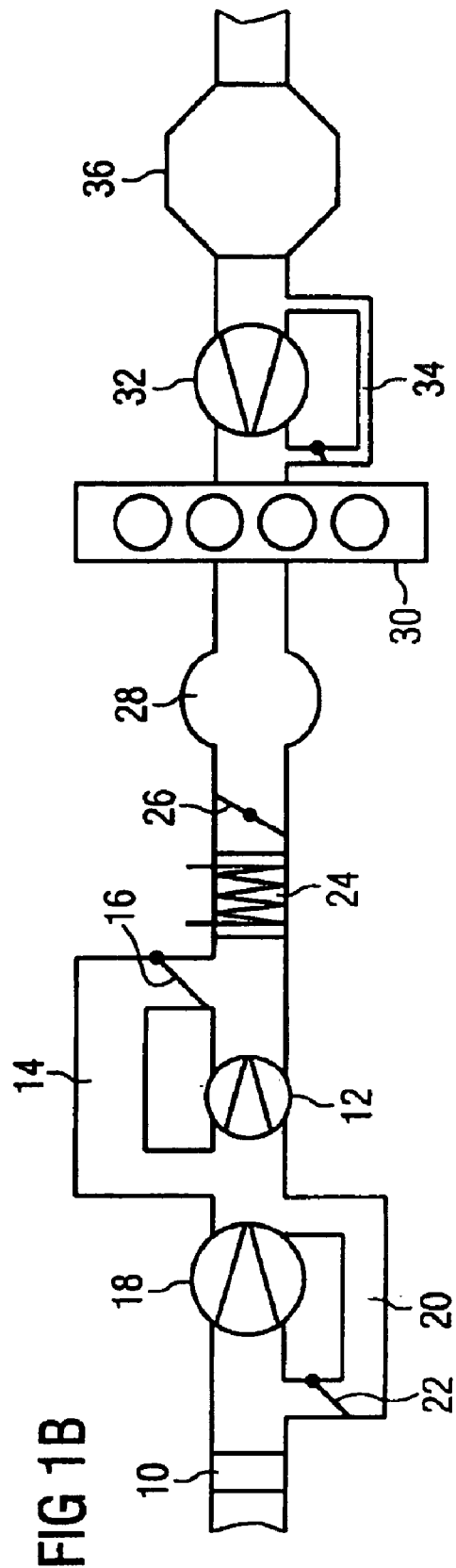

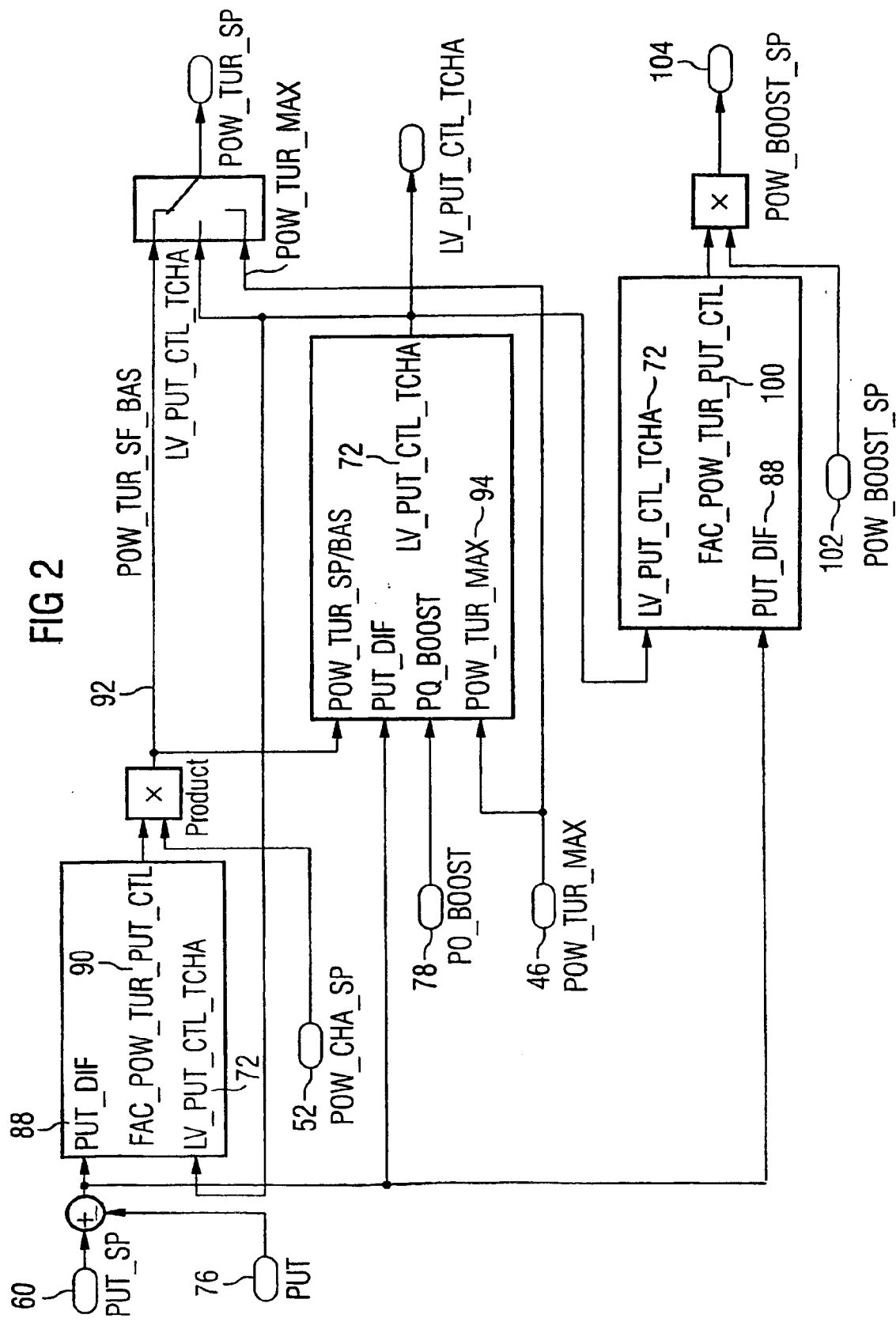

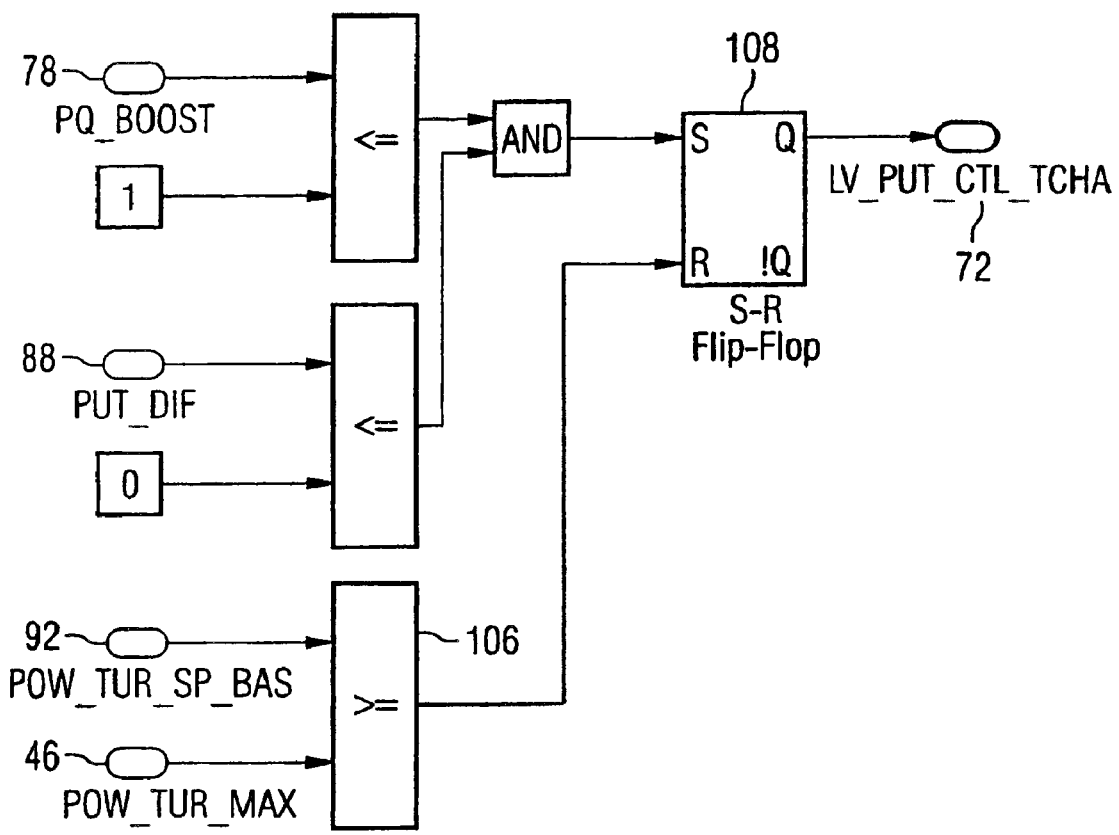

METHOD FOR CONTROLLING AN ELECTRICALLY DRIVEN COMPRESSOR

CLAIM FOR PRIORITY

This application is a continuation of International Application No. PCT/DE03/00018 which was filed on Jan. 7, 2003 and published on Jul. 24, 2003 and which claims the benefit of priority to German Application No. 102 02 146.5 filed Jan. 21, 2002.

TECHNICAL FIELD OF THE INVENTION

The invention relates to a method for controlling an electrically driven compressor in a internal combustion engine with an exhaust gas turbocharger.

BACKGROUND OF THE INVENTION

To increase the power of internal combustion engines exhaust gas turbochargers are used which compress the inlet air in order to increase the air throughput of the engine.

A disadvantage of an exhaust gas turbocharger lies in the fact that a certain of exhaust mass flow is necessary to produce the required turbine power. A further disadvantage of the turbocharger lies in the fact that mechanism first has to be accelerated before the required operating point is reached. These disadvantages of the exhaust gas turbocharger lead to what is known as the "turbo lag", which manifests itself as a delay in the case of positive jumps in load.

To compensate for the turbo lag the use of an electrically driven compressor, an e-booster, in addition to the exhaust gas turbocharger is known. This involves using a compressor turbine which is driven by an electric motor and additionally compresses the air.

SUMMARY OF THE INVENTION

The invention provides a method for controlling an electrically driven compressor, in which the compressor is connected with minimum power for its electrical operation.

In one embodiment of the invention, a turbine model determines the turbine power available at a particular moment. A compressor model determines the compressor power required at a particular time. If the compressor power required is greater than the available turbine power, a pressure to be generated by the electrical compressor is determined in an inverse compressor model. In a charge control the pressure to be generated by the electrically driven compressor is used to determine the power required for the compressor. The electrically driven compressor is activated by a controller corresponding to its required power. In the method in accordance with the invention, the electrically driven compressor is connected if the turbo power of the exhaust gas turbocharger available at that moment is not sufficient. With the method in accordance with the invention, connection is controlled on the basis of a power balance between the exhaust gas turbocharger and the electrically driven compressor.

In a preferred embodiment of the invention, charge pressure control is provided which, in the case in which the electrically driven compressor is connected, activates the turbine with maximum power and controls the charge pressure using the electrical compressor power. This charge pressure control ensures that the electrically driven compressor is connected with minimum power in its connected state. At the same time the occurrence of "turbo lag" is prevented.

The charge pressure is preferably controlled using a PID regulator for the turbine of the exhaust gas turbocharger and for the electrically driven compressor.

Preferably, the charge pressure control determines the required values for the turbine power and for the power of the electrically driven compressor, as well as a signal for whether the electrically driven compressor is connected.

The turbine model preferably determines the instantaneously available turbine power depending on the exhaust gas mass flow from the engine, a turbine speed and an exhaust gas temperature.

The compressor model preferably determines the required values for the power required at the time by the turbine of the exhaust gas turbocharger and of the electrically driven compressor. These values are determined in the compressor model preferably depending on at the mass air flow, the ambient pressure, the inlet air temperature before the compressor, the maximum compressor power and the current charge pressure.

The required value for the mass air flow is used as the value for the air mass flow and the required value for the instantaneous charge pressure as the charge pressure value.

Depending on the required pressure value of the electrically driven compressor, the ambient pressure, the mass air flow and the inlet air temperature before the electrically driven compressor, the inverse model for the electrically driven compressor determines the required power value for the electrically driven compressor. Preferably, the inverse model for the electrically driven compressor uses the required value for the mass air flow as the mass air flow value.

In addition, an inverse turbine model can be provided which determines the required value for the pressure quotients over the turbine of the exhaust gas turbocharger and the required value for the exhaust gas mass flow. The inverse turbine model determines the required value for the exhaust gas mass flow through the turbine and the required value for the pressure quotient over the turbine depending on the required value for the turbine power, the turbine speed, the exhaust gas temperature before the turbine, the required value for the turbine power and independently of this whether the electrically driven compressor has been connected or not.

Preferably, an e-booster is provided as electrically driven compressor which is arranged upstream from the compresser of the exhaust gas turbocharger. Alternately, the e-booster can be arranged downstream from the compressor of the exhaust gas turbocharger.

The method in accordance with the invention can be used for any type of register charging in which compression is undertaken by connecting an electrical load.

BRIEF DESCRIPTION OF THE DRAWINGS

The invention is described in greater detail on the basis of the following figures. In the drawings:

FIGS. 1A and 1B shows an overview of register charging with an electrically driven compressor according to two preferred embodiments.

FIG. 2 shows a view of the charge pressure regulation.

FIG. 4 shows a view of the coordination of the charge pressure regulation.

DETAILED DESCRIPTION OF THE INVENTION

Figure 3:
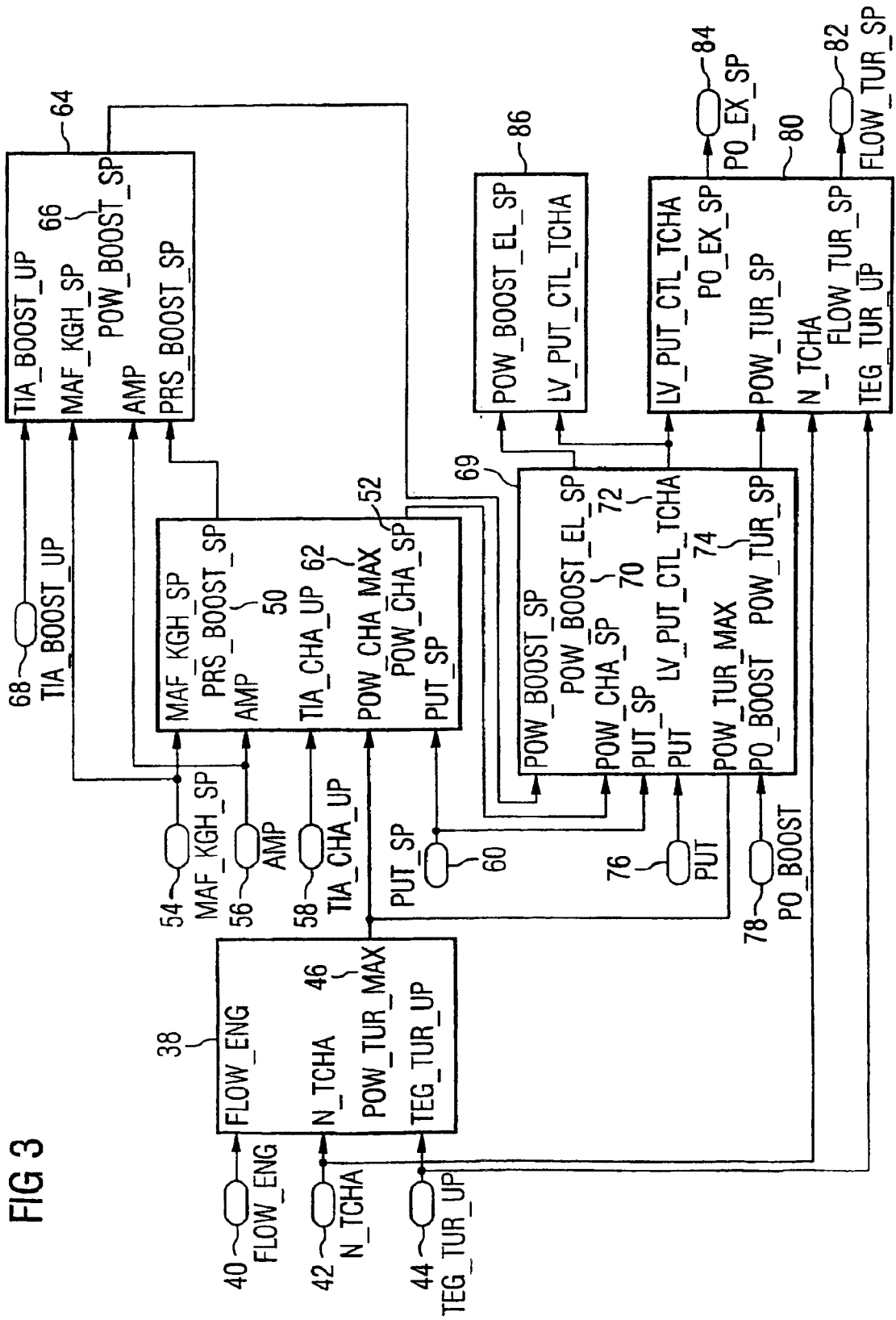
FIG. 3 shows a system overview.

FIG. 1A shows a schematic overview diagram of register charging with an e-booster as an electrically driven compressor. The flow path depicted starts with an air filter 10. Downstream of the air filter 10 an e-booster 12 is provided. Parallel to the e-booster 12 there is a bypass channel 14, in which a controllable butterfly valve 16 is arranged. So that the electrically driven compressor 12 responds rapidly and provides the required pressure without any lag, this is a small design. To obtain a sufficient air mass flow with a small compressor the bypass channel 14 is provided.

Downstream from the e-booster 12 a compressor 18 of an exhaust gas turbocharger is provided. A bypass channel 20 with a controllable butterfly valve 22 is arranged in parallel to the compressor 18. The bypass channel 20 is opened at times to protect the exhaust gas turbocharger in order to pump air into the circuit at a corresponding pressure quotient via the compressor 18 of the exhaust gas turbocharger. FIG. 1B shows an alternative embodiment where the e-booster 12 is arranged downstream of the compressor 18, rather than upstream as shown in FIG. 1A.

Downstream from the compressor 18 of the exhaust gas turbocharger a charge air cooler 24 is provided. Connected to the charge air cooler 24 are a butterfly valve 26, and inlet air line 28 and cylinders 30 of the internal combustion engine.

Shown schematically further downstream is a turbine 32 of the exhaust gas turbocharger. The diagram shows a wastegate 34 in parallel to the turbine 32 of the exhaust gas turbocharger which controls the air flow through the turbine 32. A conversion is undertaken downstream in a catalyzer 36 shown schematically.

FIG. 3 shows a schematic overview in which the method in accordance with the invention is illustrated by individual model blocks. The exhaust gas mass flow from the engine 40 (FLOW ENG), the turbocharger speed 42 (N TCHA) and the exhaust gas temperature before the turbine 44 (TEG TUR UP) are present as input variables at the turbine model 38. The turbine model 38 calculates from these variables the maximum turbine power 46 (POW TUR MAX), that is the gross power of the turbine taking account of its efficiency.

A compressor model 48 calculates the required value 50 for the pressure at the e-booster (PRS BOOST SP). Similarly the compressor model 48 calculates the required value 52 for the compressor power (POW CHA SP).

Input variables for the compressor model 48 are the required value for the mass air flow 54 (MAF KGH SP), the ambient pressure 56 (AMP), the inlet air temperature 58 before the compressor of the exhaust gas turbocharger (TIA CHA UP) and the required value 60 for the charge pressure (PUT SP). The maximum turbine power 46 is also present as an input variable as maximum power (POW CHA MAX) of the compressor of the exhaust gas turbocharger 62 at the compressor model 48.

The inverse model for the e-booster 64 determines the required value for the booster power 66. The ambient pressure 56 (AMP), the required value for the mass air flow 54 (MAF KGH SP), the inlet air temperature 68 before the e-booster (TIA BOO-ST UP) and the required value for the booster pressure (PRS BOOST SP) 50 are present as input variables at the inverse model for the e-booster.

A charge pressure control is shown schematically in FIG. 3 as block 69 The charge pressure control defines as its output variable the required value for the booster pressure 70 (POW BOOST EL_SP) a flag 72 for the status of the charge pressure control (LV PUT CTL TCHA) and a required value 74 for the turbine power (POW TUR_SP). The charge pressure control 69 possesses as input variable the required value of the booster power 66 from the e-boost inverse model 64, the required value for the compressor power 52 of the exhaust gas turbocharger from the compressor model 48, the required value for the charge pressure 60, the charge pressure 76 (PUT) and the pressure quotient at the e-booster 78 (PQ BOOST). The pressure quotient 78 is the quotient of the pressure after the booster divided by the pressure before it.

The output variables of the charge pressure control are available at the inverse model for the turbine 80. At the inverse turbine model the flag for the status of the charge pressure control 72 (LV_PUT CTL TCHA) and the required value for the turbine power 74 are present as input variable at the inverse turbine model. Further the turbocharger speed 42 and the exhaust gas temperature before the turbine 44 are present at the inverse turbine model 80. The required value for the exhaust gas mass flow through the turbine 82 and the required value for the pressure quotients over the turbine 84 (PQ EX SP) are calculated as output variables of the inverse turbine model.

The e-booster is controlled by the booster control 86, at which the flag for the status of the charge pressure controls 72 and additionally the required value for the booster power 70 are present.

FIG. 2 shows the charge pressure control 69 in detail. Starting from the required value for the charge pressure 60 and the actual value for the charge pressure 76 the difference is formed as required value minus actual value. The deviation of the charge pressure from the required value for the charge pressure 88 (PUT DIF) is processed together with the flag for the status of the charge pressure control 72 (LV_PUT_CTL TCHA) into a factor for the turbine power 90 (FAC_POW_TUR_PUT_CTL). The factor is multiplied by the required value for the turbine power 52. The product is forwarded as basic value for the required value of the turbine power 92.

The basic value for the required value of the turbine power 92 is present at a coordination block of the charge pressure control 94. Further the charge pressure control 94 is coordinated depending on the pressure quotients at the booster 78 and the maximum turbine power 46. The output variable of the coordination of the charge pressure control 94 is the flag for the status of the charge pressure control 72 which assumes the value of 1 if the booster is switched off and assumes the value of 0 when the maximum power of the turbine is required.

The power of the booster is controlled in a similar way to determining the basic value for the required value of the turbine power. Depending on the state of the charge pressure control and the control deviation of the charge pressure 88 a factor for the turbine power 100 (FAC POW TUR PUT CTL) is determined and multiplied by the required value for the booster power 102. The product is forwarded as the required value for the booster power 104 (POW BOOST EL_SP).

FIG. 4 shows a possible embodiment for coordination of the charge power control. In the lowest branch the basic value for the required value of the turbine power is compared to the maximum power of the turbine 46. The comparator 106 generates a 1 if the basic value for the required value of the turbine power is greater than or equal to the maximum turbine power. The output signal of the comparator 106 is present at an S-R flip-flop 108 at the Reset input. The logical AND of the two comparisons is present at the S-input of the flip-flop 108. The first comparison checks whether the pressure quotient at booster 78 is less than or equal to 1. If this is the case the pressure is not built up by the booster. As the second variable a comparison is made as to whether the charge pressure 88 is less than or equal to 0. The control deviation, as already explained above is formed as the difference between the required value and the actual value, so that a negative control deviation indicates that the actual value is greater than the required value. The status bit 72 (LV PUT CTL TCHA) is generated at the output of the S-R flip-flop 108.

What is claimed is:

1. A method for controlling an electrically driven compressor in an internal combustion engine with an exhaust gas turbocharger comprising:

determining turbine power instantaneously available;

determining compressor power instantaneously required, when a required compressor power is greater than the available turbine power of the exhaust gas turbocharger, a pressure to be generated by an electrically driven compressor is determined in an inverse compressor model;

determining, using the pressure to be generated by the electrically driven compressor, the required powers of the turbine of the exhaust gas turbocharger and the electrically driven compressor; and controlling the electrically driven compressor in accordance with the power required, wherein, when the electrically driven compressor is connected, a charge pressure control activates the turbine with a maximum power and controls the charge pressure by adjusting the power of the electrically driven compressor.

2. The method in accordance with claim 1, wherein the charge pressure control has a PID regulator for the turbine of the exhaust gas turbocharger and the electrically driven compressor respectively.

3. The method in accordance with claim 2, wherein the charge pressure control determines the required values for the turbine power, for the power of the electrically driven compressor, and a signal indicating whether the electrically driven compressor is connected.

4. The method in accordance with claim 1, wherein a turbine model determines the turbine power instantaneously available depending on the exhaust mass flow from the engine, the turbine speed, and an exhaust gas temperature before the turbine.

5. The method in accordance with claim 1, wherein a compressor model determines the required values for the instantaneously required power of the electrically driven compressor and the turbine.

6. The method in accordance with claim 5, wherein, a compressor model determines the required values for the electrically driven compressor and turbine depending on a mass air flow, an ambient pressure, the inlet air temperature before the compressor, the maximum compressor power and current charge pressure.

7. The method in accordance with claim 6, wherein the required value for the mass air flow is used as the mass air flow.

8. The method in accordance with claim 6 or 7, wherein the required value for the current charge pressure is used as the charge pressure.

9. The method in accordance with claim 1, wherein an inverse compressor model for the electrically driven compressor is determined depending on the required pressure value of the electrically driven compressor, an ambient pressure, mass air flow and an inlet air temperature before the electrically driven compressor the required value for the power of the electrically driven compressor.

10. The method in accordance with claim 9, wherein the inverse compressor model of the electrically driven compressor uses the required value for the mass air flow as mass air flow.

11. The method in accordance with claim 1, wherein an inverse turbine model is provided which determines the required value for the pressure quotients over the turbine and the required values for the exhaust mass flow through the turbine.

12. The method in accordance with claim 11, wherein the inverse turbine model determines output variables depending on the required value for the turbine power, turbine speed, exhaust gas temperature before the turbine and the required value for the turbine power, and by whether the electrically driven compressor is connected or not.

13. The method in accordance with claim 1, wherein an e-booster is provided as electrically driven compressor which is arranged downstream of the compressor of the exhaust gas turbocharger.

14. The method in accordance with claim 1, wherein an e-booster is provided as electrically driven compressor which is arranged upstream of the compressor of the exhaust gas turbocharger.

* * * * *